2 Sheets—Sheet 1.

D. W. KEITH.

NAIL-PLATE FEEDER.

No. 6,874. Reissued Jan. 25, 1876.

Witnesses,
W. J. Cambridge
J. E. Cambridge

Inventor,
David W. Keith,
Per Teschemacher & Stearns,
Attorneys.

N. PETERS, PHOTO-LITHOGRAPHER, WASHINGTON, D. C.

D. W. KEITH.

NAIL-PLATE FEEDER.

No. 6,874. Reissued Jan. 25, 1876.

Witnesses,
W. J. Cambridge
J. E. Cambridge

Inventor,
David W. Keith,
Per Teschemacher & Bliss
Attorneys.

N. PETERS, PHOTO-LITHOGRAPHER, WASHINGTON, D. C.

UNITED STATES PATENT OFFICE.

DAVID W. KEITH, OF WEST WAREHAM, MASSACHUSETTS.

IMPROVEMENT IN NAIL-PLATE FEEDERS.

Specification forming part of Letters Patent No. 159,932, dated February 16, 1875; re'ssue No. 6,874, dated January 25, 1876; application filed November 18, 1875.

*To all whom it may concern:*

Be it known that I, DAVID W. KEITH, of West Wareham, in the county of Plymouth and State of Massachusetts, have invented certain Improvements in Mechanism for Turning and Feeding Tack and Nail Plates, of which the following is a full, clear, and exact description, reference being had to the accompanying drawings making part of this specification, in which—

Figure 1:
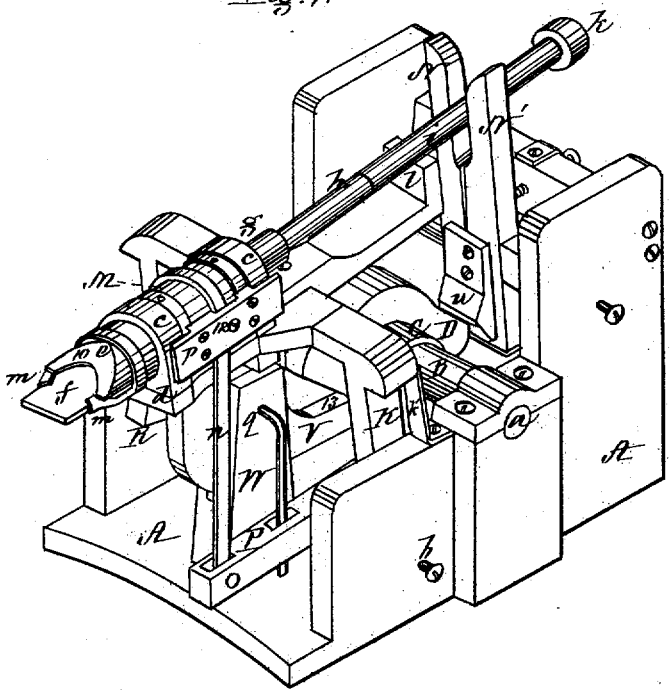
Figure 2:
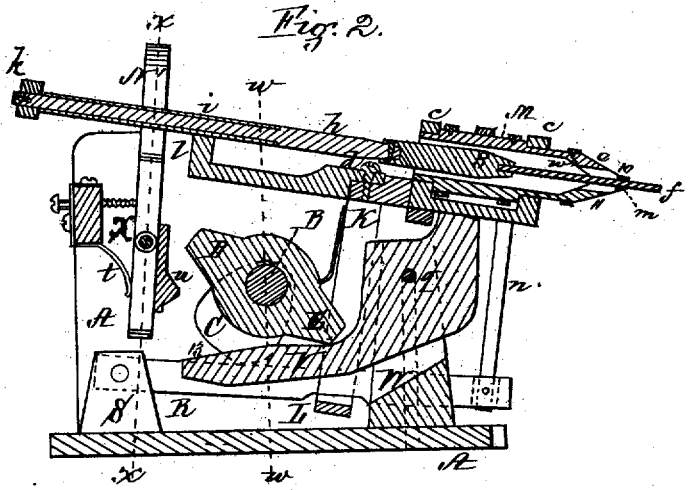
Figure 3:
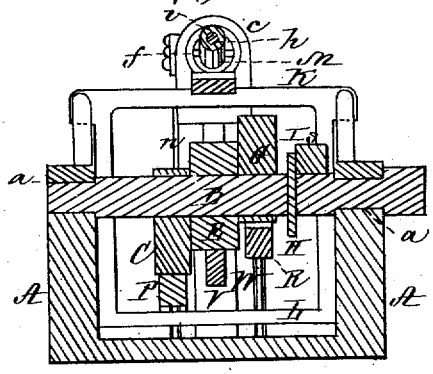
Figure 4:
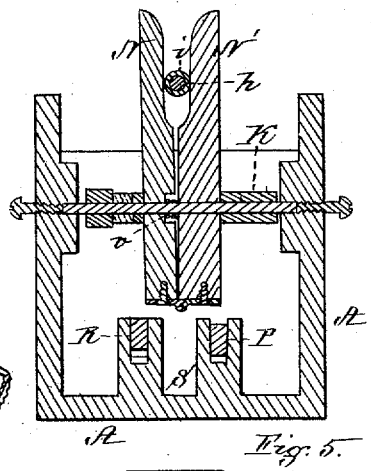
Figure 8:
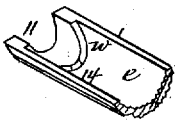
Figure 5:
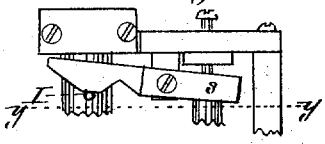
Figure 7:
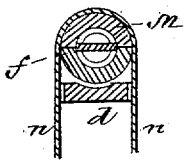
Figure 6:
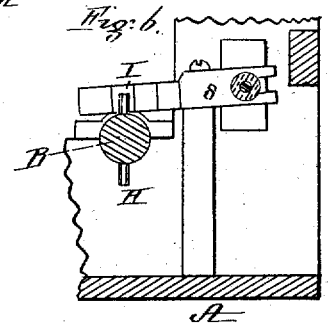

Figure 1 is a perspective view of a machine for turning and feeding tack and nail plates when constructed in accordance with my invention. Fig. 2 is a longitudinal vertical section through the center of the same. Fig. 3 is a transverse section on the line *w w* of Fig. 2. Fig. 4 is a transverse section on the line *x x* of Fig. 2; Fig. 5, plan of a portion of the machine. Fig. 6 is a vertical section on the line *y y* of Fig. 5. Fig. 7 is a section through the barrel which turns the plate; Fig. 8, perspective view of the interior of the "nose-piece" or forward end of the barrel.

My invention has for its object to produce a simple mechanism for automatically turning and feeding the plate from which the nails or tacks are to be made; and consists in a peculiar combination of levers and cams for turning the plate; and also consists in a pair of vibrating jaws brought together by means of a lever operated by one or more pins or cams, for the purpose of holding the rod or sleeve surrounding the rod with which the plate is connected, the jaws in this position (while holding the rod) being advanced by the revolution of a cam which comes in contact therewith.

My invention also consists in so constructing the interior of the nose-piece, through which the plate is fed, as to form guides for directing it into its proper position relative to the cutters, thus admitting of the insertion of the plate without stopping the machine, and insuring a uniform intermittent feed, as desired.

And my invention furthermore consists in cams of peculiar construction, acting on bent levers arranged with respect thereto in such manner as to periodically raise and lower the vibrating frame and its rotating barrel and the nail-plate, and, in connection with springs and a vibrating frame, maintain the latter at rest while the nail is being cut therefrom.

To enable others skilled in the art to understand and use my invention, I will proceed to describe the manner in which I have carried it out.

In the said drawings, A is the frame-work, in suitable bearings *a* in which runs the driving-shaft B, which carries four cams, C D E G, and two pins or projections, which, as they fulfill the office of cams, will herein be designated as cams H I.

K is a vibrating frame, the lower ends of which are connected together by a cross-bar, L, pivoted at *b b* to the inside of the frame, while the springs *k'* hold the frame steadily against the cams D E.

In suitable bearings *c c*, rising from the front projecting portion *d* of the frame K, is supported a hollow cylindrical drum or barrel, M, the forward end of which, termed the "nose-piece" *e*, is tapered off on two of its opposite sides, as seen at 10 11.

The nail-plate *f* is grasped by a pair of nippers, *g*, to which is secured a long rod, *h*, surrounded by a sleeve, *i*, and provided with an enlargement, *k*, the sleeve resting on a support, *l*, and passing between a pair of jaws, N N', which embrace the sleeve and advance the nipper-rod *h*, with its plate, at the desired times, as will be more fully explained hereafter.

The object of the sleeve surrounding the nipper-rod is to allow the nippers and nail-plate to be turned slightly by the descent of the movable cutter in case the plate should not be seated squarely on the stationary cutter underneath when the nail is being cut.

The nail-plate *f* and nippers *g* pass longitudinally through the barrel M, the outer end of the nail-plate being held in position by spring-guides *m*, projecting (at points diametrically opposite) from the end of the nose-piece *e*, the pressure of the springs on the edges of the plate keeping it from slipping in a longitudinal direction while being turned, and at the same time allowing it to yield laterally when brought in contact with the guard of the nail-machine, (not shown,) whereby the delivery of the plate in the required line is insured.

The barrel M is alternately rotated first in one direction and then in the other, so as to turn the nail-plate, as desired, after each cut, by a strap or cord, *n*, passing over the barrel, and secured thereto at 12 under a cleat, *p*, which extends longitudinally along the barrel, one end of the strap being secured to the outer end of a lever, P, and the other end to a lever, R, the inner end of each lever being pivoted to a bifurcated standard, S, and operated alternately with the other by cams C G on the driving-shaft, the cams being situated between the fulcrums of the levers and the barrel M or work to be done.

The levers P R perform the double function of first turning the barrel M and then bringing the plate within it down on the lower or stationary cutter, in case the spring fails to bring it down thereon, the barrel continuing to turn until the cleat P comes to its bearing and stops, when the still further downward movement of the lever brings the plate to an even bearing on its bed, to be severed by the descending cutter.

The cleat P has a twofold office—to keep the strap from slipping, and serves as a stop to limit the rotation of the barrel, the ends of the cleat coming into contact with the sides of the bearings *a a* when the barrel, with its nail-plate, has turned half a revolution.

The vibrating frame K is raised, to lift the nail-plate while being turned over, by a lever, V, pivoted at *q* within a bifurcated standard, W, rising from the frame-work, the top of the lever V striking the under side of the portion *d* of the frame K, and the lever V being actuated at the required times by the cams D E coming in contact with its lower bent end 13.

The cams (or beats of the cams) D E are of similar form, and are arranged diametrically opposite, the portions between them being concentric with each other and with the outer peripheries of the cams or beats D E, and this peculiar form of the cams, in connection with the upper surface of the lower bent end 13 of the lever V, insures not only the raising and lowering of the barrel M, but causes it to remain stationary while the nail-plate is being fed forward and cut off, the vibrating frame K being at rest while the curved portions between the cams D E are in contact with the upper surface of the said bent end 13 of the lever V, it being necessary for the movement of the vibrating frame K to be temporarily suspended while the feeding and cutting off of the nail-plate takes place.

The jaws N N′ are secured upon a rock-shaft, X, and the jaw N is made to move toward the other, N′, by a lever, *s*, vibrated by the cams H I, thereby causing the sleeve *i*, surrounding the nipper-rod, to be seized, after which the jaws N N′ are rocked forward by the cams D E, against the resistance of a spring, *t*, which returns the jaws to their normal position after each cam has passed out of contact therewith, the cams striking an incline, *u*, formed at the junction of the lower end of the jaws, thus causing the nippers, with the nail-plate, to be fed forward the desired distance.

After the cams pass off the incline *u*, the jaws are separated by a spring, *v*, and carried back to their original position to be in readiness to take a new hold on the nipper-rod.

The interior of the nose-piece is, near its outer end, contracted in diameter, which contraction gives rise to shoulders 14, which from opposite points, *w′*, perpendicular to the plane of the plate, are inclined toward the end of the nose-piece, so that, if a wrong position should be given to the plate on entering, it will strike against the shoulders 14, and be arrested until the barrel shall have been turned to correspond; during which turning the plate will slide against the inclined surfaces *w′* until it comes in line with the notches in the sides of the nose-piece.

If desired, one shoulder or stop, 14, may be omitted without departing from my invention.

What I claim as my invention, and desire to secure by Letters Patent, is—

1. The levers P R, having their fulcrums at their outer ends, and the cams C G between the fulcrums of the levers and the work to be done, in combination with the vibrating frame K and rotating barrel M, with its strap or cord *n*, for the purpose of turning the nail-plate *f*, and bringing it down to an even bearing on the stationary cutter, substantially as described.

2. I also claim the jaws N N′, for seizing the rod *h*, or sleeve *i*, surrounding it, in combination with the lever *s*, cams H I, shaft B, and cams D E, substantially as and for the purpose set forth.

3. I also claim the cams D E, having their beats diametrically opposite, and the portions between them concentric with each other, and with the outer peripheries of the cams acting upon the bent end 13 of the lever V, in combination with the springs *k′*, and with the vibrating frame K, for raising and lowering the rotating barrel and its nail-plate, and maintaining the latter at rest while the nail is being cut off, all constructed, arranged, and operating substantially as and for the purpose described.

4. I also claim the nose-piece *e*, with its shoulder or shoulders 14, inclined at *w′*, in combination with the spring-guides *m*, substantially as described, for the purpose set forth.

Witness my hand this 16th day of November, A. D. 1875.

DAVID W. KEITH.

In presence of
N. W. STEARNS,
P. E. TESCHEMACHER.